(12) United States Patent
Wald

(10) Patent No.: US 12,189,740 B2
(45) Date of Patent: Jan. 7, 2025

(54) MULTI-BIOMETRIC AUTHENTICATION SYSTEM

(71) Applicant: Visa International Service Association, San Francisco, CA (US)

(72) Inventor: Jerry Wald, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 227 days.

(21) Appl. No.: 17/497,002

(22) Filed: Oct. 8, 2021

(65) Prior Publication Data

US 2023/0112458 A1     Apr. 13, 2023

(51) Int. Cl.
*G06F 21/00* (2013.01)
*G06F 21/32* (2013.01)

(52) U.S. Cl.
CPC ...... *G06F 21/32* (2013.01); *G06F 2221/2141* (2013.01); *G06F 2221/2145* (2013.01)

(58) Field of Classification Search
CPC ............. G06F 21/32; G06F 2221/2141; G06F 2221/2145
See application file for complete search history.

(56) References Cited

U.S. PATENT DOCUMENTS

| 7,043,643 | B1 * | 5/2006 | Doe ...................... H04L 9/3234 726/28 |
| 2004/0046641 | A1 * | 3/2004 | Junqua ................ H04L 63/0861 340/5.82 |
| 2004/0104266 | A1 * | 6/2004 | Bolle ....................... G07C 9/37 235/382 |
| 2006/0043169 | A1 |  3/2006 | Haertel |
| 2007/0284432 | A1 | 12/2007 | Abouyounes |
| 2009/0138366 | A1 |  5/2009 | Bemmel et al. |
| 2009/0150286 | A1 |  6/2009 | Barton |
| 2011/0191250 | A1 |  8/2011 | Bishop et al. |
| 2015/0046328 | A1 |  2/2015 | Mitra |
| 2015/0088755 | A1 |  3/2015 | Sobel et al. |
| 2015/0149310 | A1 |  5/2015 | He et al. |
| 2015/0278495 | A1 | 10/2015 | Yu et al. |
| 2015/0317638 | A1 * | 11/2015 | Donaldson ........... G06Q 20/385 705/44 |
| 2016/0027079 | A1 |  1/2016 | Schoeffler |
| 2016/0086187 | A1 |  3/2016 | Joao |
| 2016/0328717 | A1 | 11/2016 | Shaw et al. |
| 2016/0328802 | A1 | 11/2016 | Howe |
| 2019/0205889 | A1 * |  7/2019 | Cantrell ........... G06Q 20/38215 |
| 2020/0258072 | A1 * |  8/2020 | Unnerstall ....... G06Q 20/40145 |
| 2020/0320643 | A1 | 10/2020 | Nathoo et al. |
| 2022/0038462 | A1 * |  2/2022 | Chauhan ............... G06F 9/5011 |
| 2022/0108322 | A1 * |  4/2022 | Cao ..................... G06Q 20/227 |
| 2022/0307787 | A1 * |  9/2022 | Kloepfer ............ G07C 9/00563 |

FOREIGN PATENT DOCUMENTS

WO    2017063546 A1    4/2017

OTHER PUBLICATIONS

Vats et al., "Fingerprint Security for Protecting EMV Payment Cards", The 10th International Conference for Internet Technology and Secured Transactions, 2015, pp. 95-101.

\* cited by examiner

*Primary Examiner* — William A Corum, Jr.
(74) *Attorney, Agent, or Firm* — The Webb Law Firm

(57) ABSTRACT

The disclosure relates to the multi-party biometric authentication of primary and secondary parties for conducting party relationships.

16 Claims, 11 Drawing Sheets

FIG 5A. Biometric Database

| Hash of the Block | | | | |
|---|---|---|---|---|
| Block N Header | | | | |
| Verson N | Hash(N-1)Block | Timestamp | Nonce | Hash |
| Block Body | | | | |
| Block # | Primary Party | | Business Relationship | |
| Biometric | | | Business Data Link | |
| Secondary Party | Biometric N Link | | Other | |

FIG 5B. Business Data Database

| Hash of the Block | | | | |
|---|---|---|---|---|
| Block N Header | | | | |
| Verson N | Hash(N-1)Block | Timestamp | Nonce | Hash |
| Block Body | | | | |
| Block # | Primary Party | | Business | |
| Business Data | | | | |
| Other | | | | |

Fig 5C. Combined Data Database

| Hash of the Block | | | |
|---|---|---|---|
| Block N Header | | | |
| Verson N | Hash(N-1)Block | Timestamp | Nonce | Hash |
| Block Body | | | |
| Block # | Primary Party | | Business |
| Biometric | | | Business Data |
| Biometric N Link | Secndary Party Link | | Other |

Blockchain Database

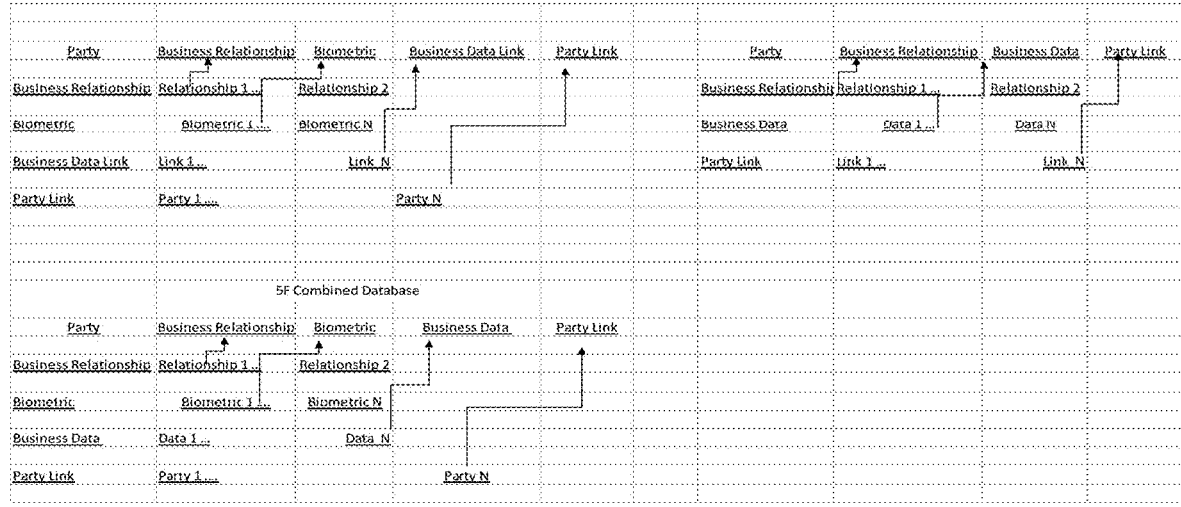
FIG. 5F Combined Database
FIG. 5E Business Data Database
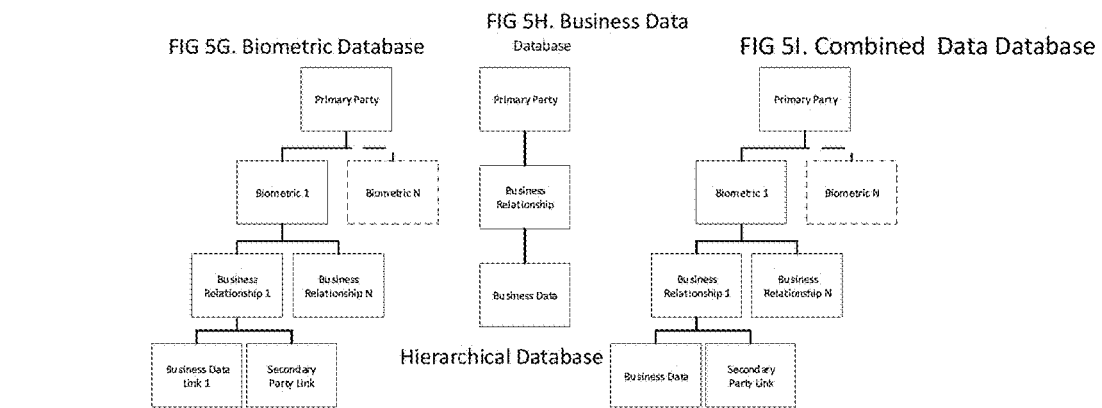

FIG 5J. Biometric Database
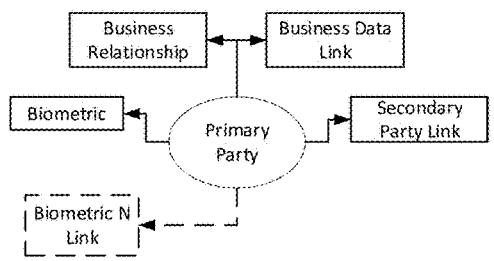
FIG 5K. Combined Data Database
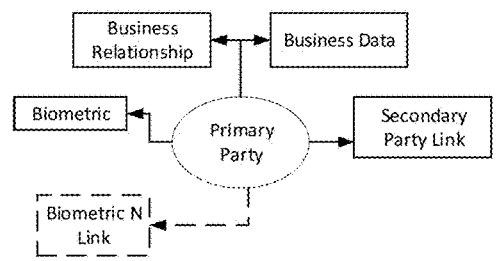
FIG 5K2. Business Data Database
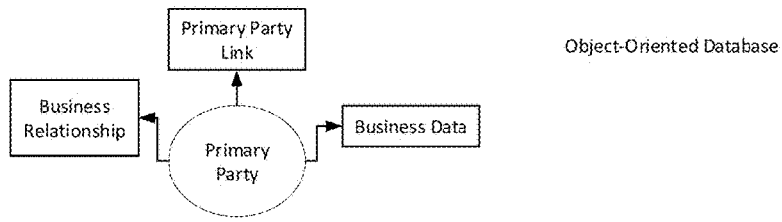
Object-Oriented Database

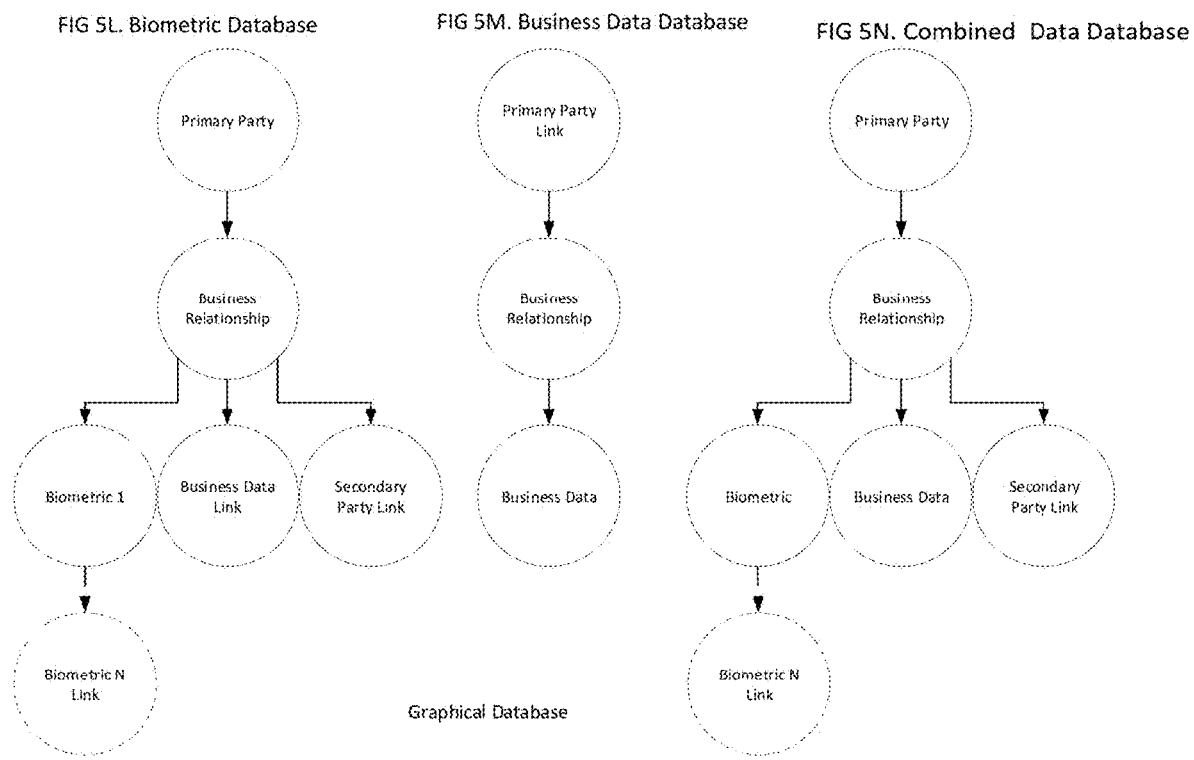

MULTI-BIOMETRIC AUTHENTICATION SYSTEM

BACKGROUND

1. Technical Field

The present disclosure relates to biometric authentication. More specifically, the disclosure relates to the use of multiple-biometrics to conduct party relationships.

2. Technical Considerations

It is increasingly commonplace to use a person's biometric to authenticate a person. Most use one biometric. For example, one fingerprint may be used both to unlock a portable device and to authenticate a person when making a payment using the device. Or, a phrase recorded by a person may be used to recognize the person, permitting access to an area, application, service or the like. Or, a vein pattern or retinal scan may be used to give a person access to an area.

It is also increasingly commonplace for a person to have one account with subaccounts accessible and usable by other authorized parties. Similarly, a person may authorize other parties to engage with, or participate in, or conduct a party relationship (for example, a contract, transaction or other legal agreement) in which they are the primary or principle party. In each of these cases, the secondary parties may use a password they are provided or create to access and use the account or to engage or participate in a party business relationship. These passwords may be lost or stolen, leading to inefficiencies if the former occurs and potential illegalities if the latter occurs.

BRIEF DESCRIPTION OF THE DRAWINGS

The example embodiments of the present disclosure are illustrated by way of example, and not in any way by limitation, in the drawings of the accompanying figures and in which like reference numerals refer to similar elements and in which:

FIGS. 5A-5N are non-limiting diagrams of database structures according to the principles of the present disclosure.

Figure 1:
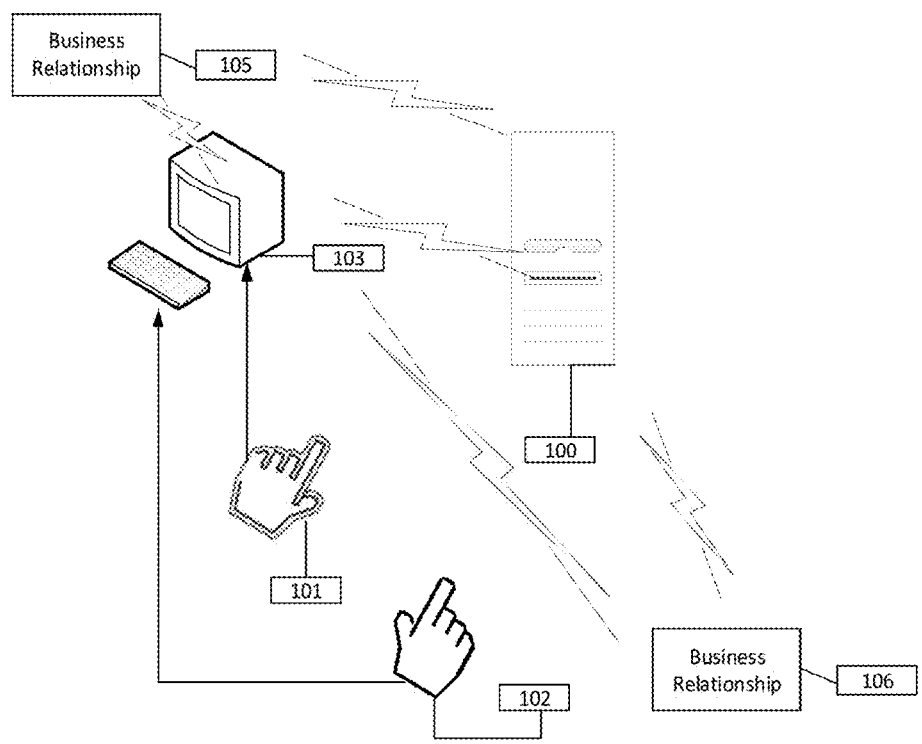
FIG. 1 is a non-limiting diagram of a multi-biometric authentication system according to the principles of the present disclosure.

While each of the figures illustrates a non-limiting embodiment for purposes of illustrating a clear example, other non-limiting embodiments may omit, add to, reorder, and/or modify any of the elements shown in the figures.

DESCRIPTION OF THE EXAMPLE EMBODIMENTS

In the following description, for the purposes of explanation, numerous specific details are set forth in order to provide a thorough understanding of example of non-limiting embodiments of the present disclosure. It will be apparent, however, that the example non-limiting embodiments may be practiced without these specific details. In other instances, well-known structures and devices are shown in block diagram form in order to avoid unnecessarily obscuring the example non-limiting embodiments. The disclosure follows the outline below:

1.0 GENERAL OVERVIEW
2.0 NON-LIMITING SYSTEM EMBODIMENTS
   2.1 EXEMPLARY BIOMETRICS
   2.2 EXEMPLARY SINGLE USER SYSTEM EMBODIMENTS
   2.3 EXEMPLARY MULTI-USER SYSTEM EMBODIMENTS
3.0 NON-LIMITING IMPLEMENTATION EMBODIMENTS
4.0 NON-LIMITING PROCESS EMBODIMENTS

1.0 General Overview

It is increasingly commonplace to use a person's biometric to authenticate a person and/or to replace or reinforce the use of a password to achieve enhanced security. For example, mobile devices may use one biometric to both unlock a device and to authenticate a person for other purposes or applications, such as for making a transaction. Mobile devices and applications provide examples wherein a fingerprint and/or face may be used for both purposes. Alternatively, a security company may use a single handprint, a set of one hand's fingerprints, or an iris scan to authenticate a person and/or to permit access to a facility or vault. The reliance on a single biometric to conduct business ignores opportunities to use more than one biometric for different purposes. It may also potentially limit the opportunity to authorize more than one person to use a device or engage or participate in a party relationship.

2.0 Non-Limiting System Embodiments

Prior to discussing embodiments of the disclosure, some terms can be described in further detail.

As used herein, the term multi-biometric authentication system or method refers to a system or method that may use more than one biometric to authenticate one or more persons.

As used herein, the terms "communication(s)" or "communication channel(s)" refer to a secure communication, such as may be enabled for email, VoIP or instant messaging, telecommunications, SMS, Wi-Fi®, Bluetooth®, or any combination thereof. A "lightning bolt" symbol is used in this disclosure's figures to illustrate at least one such communication channel and/or at least one communication between and/or among communication enabled devices and or processors.

As used herein, the term "communication" may refer to a wireless, wired, bussed or optical communication.

As used herein, the terms "wireless communications" or "wirelessly communicate" may refer to any remote communication capabilities, including, but not limited to, wireless data networks and protocols. Examples may include, but not be limited to, third-generation (3G), fourth-generation (4G), fifth-generation, (5G), Long-term Evolution (LTE), and other predecessor, future generation or similar networks, Local Area Net (LAN) networks based on the IEEE 802.11x standard (Wi-Fi), Bluetooth Based on Bluetooth Special Interest (SIT) Standards, Wide Area Net (WAN) networks based on the IEEE 802.16 set of standards (Wi-Max), Near Field Communications (NFC) based on SO/IEC 18092/ECMA-340—Near Field Communication Interface and Protocol-1 (NFCIP-1), ISO/IEC 21481/ECMA-352—Near Field Communication Interface and Protocol-2 (NFCIP-2), and a variety of existing standards including ISO/IEC 14443 Type A and Type B, and FeliCa, Broadband B-ISDN, TCP/IP (which as a minimum may include, but not be limited to, the Internet Protocol (IP), Address Resolution Protocol (ARP), Internet Control Message Protocol (ICMP), Transmission Control Protocol (TCP), User Datagram Protocol (UDP), Internet Group Management Protocol (IGMP), Neighbor Discovery Protocol (NDP), ICMPv6, and IGMPv6 and an integrated IPSec security layer), Simple Message Transfer Protocol (SMTP), FileTransfer Protocol (FTP), Code-Division Multiple Access (CDMA) protocol, Global System for Mobile (GSM) protocol, or any such preceding or future networks and/or those which may emerge, that may provide access to a network such as the Internet, a private network or a device, or any combination thereof.

As used herein, the term "wired communication" may refer to communication over a fiber optic, coaxial or twisted pair cable, bus or medium. Examples include, but not be limited to I2C, Serial Peripheral, Ethernet, or USB media. Representative wired standards include Ethernet IEEE Standard 802.3, RS-232, RS-422, RS-455, FDDI, ATM/SONET. Exemplary optical standards include, but not be limited to, Gigabit Ethernet, Fiber Channel Standard, EBSCON/SB-CON, HPPI, Synchronous Digital Hierarchy Synchronous Optical Networking, Optical Transport Network (OTN), and applicable International Electrotechnical Committee standards, such as IEC 60793-1 and 2 and IEC 60794-1 and 2.

As used herein, the term "device" may refer to a physical computing device, or programmed application hosted on a physical device, capable of transmitting, receiving and/or processing data. A device may include a processor. Examples of a "device" include, but are not limited to a vehicle such as an automobile, a mobile phone, smartphone, a laptop computer, a desktop computer, a server computer, a tablet, a wearable device, a point-of-sale device, or any other computing device, or any combination thereof.

As used herein, the term "mobile device" may refer to a device that may be operated while the consumer is mobile, such as, but not limited to, a vehicle, a mobile phone, a smartphone, a laptop computer, a tablet, or a wearable device.

As used herein, the term "commercial data" may refer to data or information that describes characteristics of a purchase, merchant, transaction, and/or other commercial qualities. Examples of commercial data may include, but are not limited to, purchased item data, purchase amount data, purchase frequency, purchase time of day data, merchant category data, merchant frequency of use/interaction data, Internet and website search data, offers, contract terms, dates, parties, policies, or any combination thereof.

As used herein, the term "interface" may refer to any device display and/or input/output device that enables a consumer to receive information as an output and enter information as an input. Examples of interfaces may include, but are not limited to a television screen, mobile phone, vehicle display, tablet, computer screen, flat screen, or point-of-sale screen. Example input/output devices may include, but are not limited to, an interactive programmable touch panel display or a programmable display with an integrated virtual or physical keyboard, a voice input and/or output device or interface, or any combination thereof.

As used herein, the term "processor" may refer to a CPU, GPU, microprocessor, system on a chip, and/or one or more virtual machine instances in a shared computing facility such as a cloud computing center that may be coupled by wired or optical busses or by one or more IEEEcapabilities noted above.

As used herein, the term "memory" may refer to a random access memory (RAM) or other dynamic storage device for storing information and software instructions to be executed by a processor, read only memory (ROM) or other static storage device for storing static information and software instructions for processors, or a mass storage device for storing information and software instructions on fixed or movable media, such as magnetic, optical, solid-state, magnetic-optical, flash memory or any other available mass storage technology.

As used herein, the term "input-output processor" may refer to and include, but not be limited to, a processor that programmed or configured to accept, transform and output inputs for storage and/or further processing. Examples may include but not be limited to analog-to-digital converters, graphics processing units, sound cards, and/or video cards.

As used herein, the term "transceiver" may refer to and include, but not be limited to, a receiver and transmitter which may or may not be integrated and which may comprise, but not be limited to, an antenna, a modem, a modulator and/or demodulator.

As used herein, the term "biometric" may refer to any type of biologically-based input provided by a user such as, but not limited to, one or more of the following: a fingerprint, a retinal image, an iris image, a facial image, a vascular image, a hand geometry image, a verbal statement or response, a voice print, a physiologic indicator, a DNA sample, a signature, and/or the like. A biometric may be used to uniquely verify or authenticate a person's identity.

As used herein, the term "primary party" refers to a person and/or entity owning a defined party relationship.

As used herein, the term "secondary party" refers to a person and/or entity to whom the primary party authorizes on a defined party relationship.

As used herein, the term "record" comprises at least one data structure including a plurality of fields.

As used herein, the term "field" refers to a grouping of characters representing an attribute or characteristic of a person or business data required to enter into and/or conduct a party relationship.

As used herein, the term "file" comprises a group of records that are organized by an application for which they are primarily used. A "primary key" in a file comprises a field identifying a record within a file.

As used herein, the term "database" comprises an organized collection of records or files. A database may either be a local or a remote database.

Figure 3:
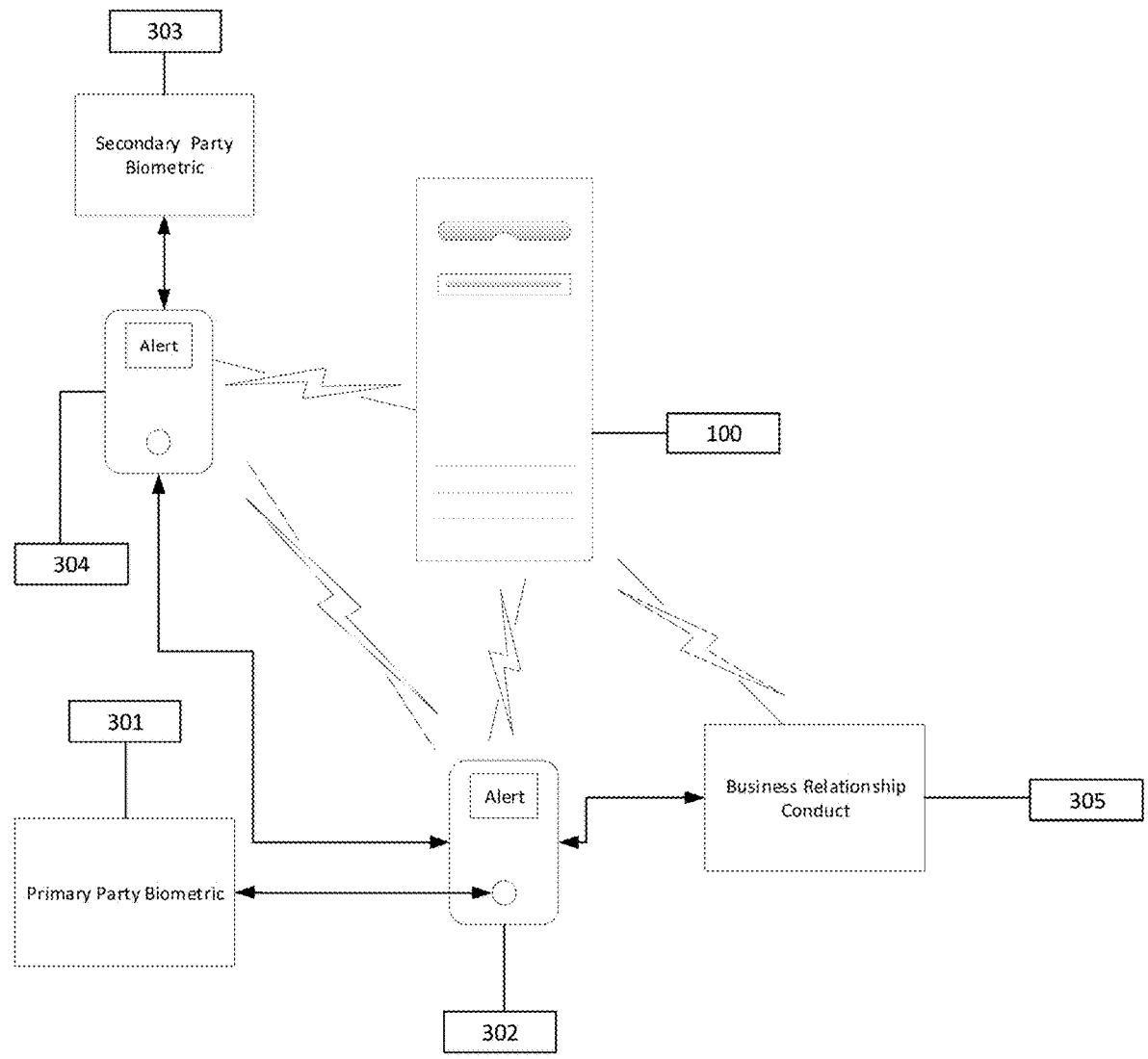
FIG. 3 is a non-limiting diagram of a multi-biometric system according to the principles of the present disclosure.
Figure 4:
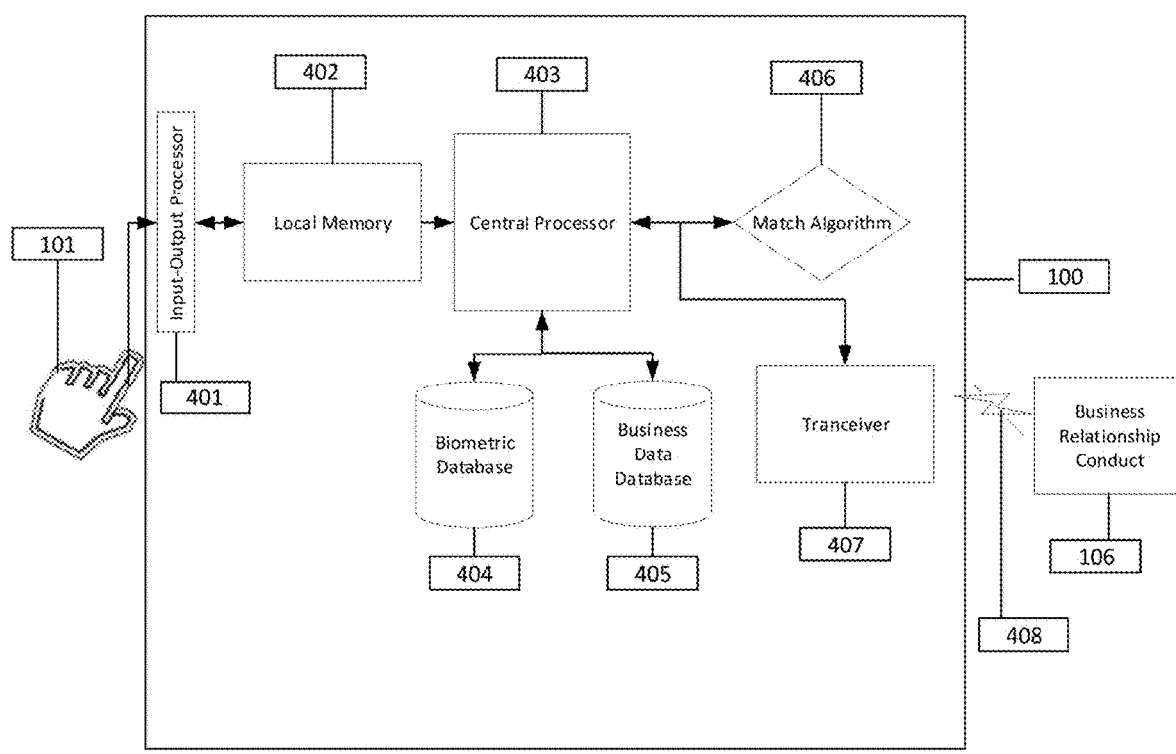
FIG. 4 is a non-limiting block diagram of a processing system according to the principles of the present disclosure.

FIG. 1, FIG. 3 and FIG. 4 illustrate exemplary non-limiting aspects of embodiments of a multi-party biometric authentication systems (simply referred to as a processing system in the following disclosure) in which the techniques described herein may be practiced. At least one processing system 100 is programmed or configured to receive, secure and efficiently process biometric and business related data in a host infrastructure wherein the business related data may pertain to an account used, for example, in completing agreed-upon acts to fulfill a business arrangement between two parties such as conducting a transaction or executing a contract (referred to herein as a party relationship). The processing system 100 may be a centralized or distributed processing system implemented across one or more physical or virtual computing devices, none of which is intended as a generic computer, since it is loaded with instructions in a new ordered combination as otherwise disclosed herein to implement the functions and algorithms of this disclosure. The example components of the processing system 100 may be implemented at least partially by hardware of one or more computing devices, such as one or more hardware processors executing stored program instructions stored in one or more memories for performing the functions and communicating with one or more data entry devices and databases that are described herein. In some non-limiting embodiments, one or more virtual machine and database instances in a shared computing facility such as a cloud computing center may be used. The functions described herein are intended to indicate operations that are performed using programming in a special-purpose computer or general-purpose computer, in various non-limiting embodiments. The representative diagrams of the at least one processing system 100 in FIG. 1, FIG. 3 and FIG. 4 illustrate at least one of many possible arrangements of components configured to execute the operating of the at least one processing system described herein. Other arrangements may include fewer or different components, and the division of work between the components may vary depending on the arrangement. FIG. 1, FIG. 3 and FIG. 4 operations are discussed in more detail below.

2.1 Exemplary Single User System Embodiments

FIG. 1 illustrates a representative use case wherein at least one primary party 101 may be interacting with at least one device 103 which may be in communication with at least one processing system 100 while conducting at least one party relationship 105. The at least one primary party may use at least one biometric 101 to authenticate themselves to unlock the at least one device 103. Once unlocked the at least one primary party may use the same biometric 101 to enter into, participate in and/or conduct at least one party relationship 105. Additionally or alternatively, the at least one primary party may use, or authorize at least one secondary party to use, at least one second, different biometric 102 to access the same device 103 or at least one second device (not shown) and/or to enter into, participate in and/or conduct at least one second business purpose, party relationship 106, in association with the same data or different business data.

2.2 Exemplary Biometrics

Figure 2:
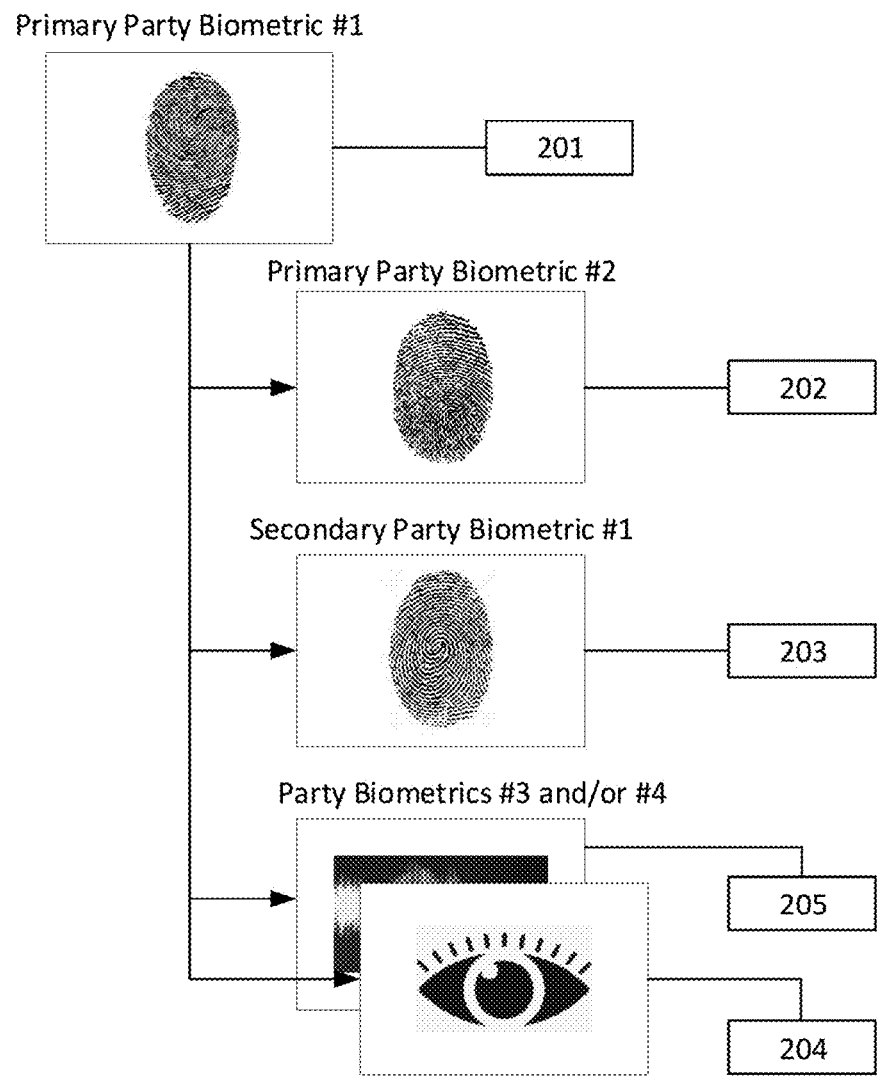
FIG. 2 is a non-limiting diagram of biometrics according to the principles of the present disclosure.

FIG. 2 illustrates examples of the types of biometrics that may be used by and be received by the illustrative multi-biometric authentication system depicted according to non-limiting embodiments in FIG. 1, FIG. 3 and FIG. 4. At least one biometric 201, depicted here as a fingerprint for illustration purposes only, may be that of at least one primary party owning or able to interact with at least one device, and may be associated with business data relating to the primary party's at least one party relationship. Exemplary business data may be, but are not limited to be, a bank account, a business account, a contract number, and/or other similar party relationship identifiers based on primary or secondary party is authorized. A representative party relationship may be a financial transaction, a smart contract, a legal document, lease or rental agreement on which one or more primary or secondary parties may be authorized. The primary party may use the biometric 201 to unlock a device, to authenticate themselves with respect to at least one party relationship, or to enter into or conduct at least one party relationship, or any combination thereof.

At least one biometric 202 may represent the at least one primary party's at least one second, different biometric, illustrated here as a second, different fingerprint. The primary party may use second biometric 202 for at least one second purpose related to the same party relationship or different at least one party relationship. If the second biometric 202 is not associated with the same business data, it may be associated with at least one second business data.

In some non-limiting embodiments, biometric 203 may represent at least one biometric of at least one secondary party that the primary party may have authorized to participate in at least one party relationship. The biometric 203 is represented for illustrative purposes as a fingerprint that is distinct from the primary party's biometrics 201 and 202.

While fingerprints are used to represent the biometrics of the at least one primary and secondary parties in connection with non-limiting embodiments discussed herein, these and other biometrics may be used in different combinations, for different party relationships, for different business purposes, and in association with different business data. For example, biometrics 204 and 205 may represent at least one primary or secondary party's retinal image 204, voice print 205, or vascular image (not shown), among others, and may also be used and substituted for those depicted as 201 and 202 or used by the at least one primary or secondary party for additional business purposes, party relationships and/or in association with additional or different business data, or any combination thereof.

2.3 Exemplary Multi-User System Embodiments

FIG. 3 illustrates a representative use case according to non-limiting embodiments where at least one primary party may unlock a device and the at least one primary party may authorize at least one secondary party to enter into, participate in and/or conduct at least one party relationship 305.

At least one processing system 100 may be in communication with at least one device 302 and provide the processing for this illustrative use case as it did for the single-user use case described above. As in the single-user use case, at least one primary party may use at least one of their biometrics 301 to unlock the at least one device 302 and to initiate, enter into, participate in and/or conduct at least one party relationship 305.

To enable at least one secondary party to also enter into, participate in and/or conduct the at least one party relationship 305, the at least one secondary party may enter at least one of their biometrics 303 on at least one device 304. Once entered, the at least one primary party may receive a message on or from the at least one device 302 asking the at least one primary party to authorize the at least one secondary party and to authorize the use of the at least the one secondary party's at least one biometric 303 when entering into, participating in and/or conducting the at least one party relationship 305. Once authorized, a linkage may be created between the at least one secondary party's biometric 303 and the at least primary party's at least one biometric 301 for use with respect to the at least one party relationship 305 for which they may have been authorized. A linkage may include, for example, a pointer stored in at least one database structure that that may refer to another data stored in at least one other data structure, an indicia stored in one data structure that may be at least partially matched with another indicia stored in another data structure, and/or the like. The at least one linkage may then be communicated to and stored as at least one database structure described below in at least one database of the at least one processing system 100.

Once authorized, the at least one secondary party may use at least one of their own devices 304 to enter into, participate in and/or conduct at least one party relationship 305 using their at least one authorized biometric 303.

Just as at least one primary party may use one or more biometrics to conduct one or more party relationships, so may the at least one primary party authorize an at least one secondary party to use one or more of their biometrics to enter into, participate in and/or conduct one or more party relationships. In each case the primary party's second biometric and/or the biometric of a secondary party may be linked and stored in at least one database structure in at least one database of the processing system 100.

3.0 Non-Limiting Implementation Embodiments

FIG. 4 illustrates non-limiting embodiments of the processing system 100. The biometric 101 represents the at least one biometric depicted in FIG. 1 that may be received by the processing system 100. Biometric 101 may comprise, among others, any of the biometrics illustrated in FIG. 2.

The processing system 100 may comprise at least one input-output processor 401, at least one local memory 402 that may receive and temporarily store the at least one biometric 101, at least one biometric database 404 that may store the primary and/or secondary parties' biometrics in at least one data structure characterized below and may communicate the at least one biometric to at least one processor 403, at least one business data database 405 that may store business data associated with each primary and/or second parties' biometric in at least one data structure. Both the primary and/or secondary parties' biometric(s) and business data may be associated with at least one party relationship that may also be stored in t least one data structure stored in databases 404 and 405. The business data may also be communicated to the processor 403. The business data and/or at least one party relationship of the primary and/or secondary parties may either be the same, different, or any combination thereof.

The business data may be communicated to the processor 403. In response to receiving an at least one biometric and the business data, the processor 403 may execute at least one matching algorithm 406 to at least partially match the received biometric(s) of at least one party with at least one biometric of the at least one party. If at least partial matches occur, then at least one authorization message 408 may be automatically generated and/or formatted by the processor 403 and communicated by at least one transceiver 407 to the business to which the business data pertains (for example a bank, merchant, governmental agency or other like entity) indicating that the at least one party may be authorized to enter into, participate in, or conduct the at least one party relationship 105 or 106 using the business data associated with the one matched biometric. If at least a partial match is not made, then the at least one party relationship 105 or 106 may not be entered into, participated in or conducted.

The at least one biometric received by the input-output processor 401 may be in at least one of several formats, for example a spatial image in the case of a fingerprint, iris scan or vascular image, or a spatiotemporal frequency plot, as may be the case for a voice print. If so received, the biometric may be sent to the local memory 402 to be communicated to at the processor 403 prior to being stored in the database 404, in response to which the at least one processor 403 may automatically digitize the at least one received biometric for storage and matching purposes. Exemplary digitization processing according to non-limiting embodiments is described further below.

Alternatively, a device, for example devices 103, 302 or 304, used by a party may be appropriately equipped and programmed to perform a digitization of the type to be described, in which case a digital representation of the at least one biometric may be communicated to and received by the input-output processor 401 and the local memory 402, in which it may be sent to the processor 403 and be directly stored in the at least one database 404.

Wherever the digitization processing occurs, in non-limiting embodiments the programmed digitization processes used may depend on the biometric. If the at least one biometric is spatial in nature, like a fingerprint, then image processing may comprise preprocessing that removes sensor artifacts and/or noise (such as background related noise) from an image, normalization, and formatting for the next stage(s) of processing, which may further comprise minutia-based and/or image-based feature extraction that may provide extracted feature inputs into one or more template generation algorithms that may then output a template suitable for hashing and/or encrypting, and storing the digital representation of the biometric in the at least one biometric database 404. Microprocessor and/or microcontroller hosted programs within the at least one device exemplified by 103, 302 or 304 and/or within the processor 403 may be used to perform such functions.

If the at least one local memory 402 receives, or a device captures and digitizes, a spatiotemporal biometric, for example, a voice print, then appropriate spatiotemporal digitization processing may be performed. This processing may comprise, but not be limited to, preprocessing that may remove sensor artifacts and/or noise (such as background related noise) from the spatiotemporal input and then normalize and format the input for the next stage of processing which may include feature extraction. For example, if the biometric comprises a voice print, the processing may apply acoustic, phonetic, and language models and/or dictionaries to decode phonic and acoustic features and extract words appearing in a voice print, thereby producing an digital representation of the voice print biometric suitable for hashing and/or encrypting and storing in the at least one biometric database 404.

In non-limiting embodiments in which the spatiotemporal biometric is gestural, such as a gait, or otherwise comprises a visible or measurable time-varying behavioral or biological pattern, then the processing may also comprise preprocessing that removes sensor artifacts and/or noise (such as spectral noise) from the spatiotemporal input such that the input can then be normalized and formatted as an input to the next stage of processing which may use skeletal algorithms to extract skeletal features on the basis of their relative positions and angular and hierarchical relationships, which may then be digitized, hashed, and/or encrypted and stored in the at least one biometric database 404. Again, microprocessor and/or microcontroller hosted programs within a device and/or the processor 403 may be used to perform such functions.

The digitized representations of the biometrics stored in the biometric database 404 may be used with and linked to business data needed to enter into, participate in, and/or conduct at least one party relationship 106. The business data that may be required may be provided by at least one primary party when enrolling on a physical device or through an application hosted on the device. Similarly, the business data that may be required may be provided by at least one secondary party at the time they are authorized by the at least one primary party to enter into, participate in, or conduct at least one party relationship. For either, or both, the primary and secondary parties, the business data may also be provided at other times. This business data may be stored in at least one business data database 405. The at least one biometric database 404 and the at least one business data database 405 may be separate databases or the same database of the processing system 100.

Digital representations of a biometric may be written to and stored within at least one field of a record within the at least one biometric database 404. For security and privacy purposes, the digital representation of the biometric may be hashed and/or encrypted prior to it being written and stored in a field. Similarly, the business data provided by a party that may be used to conduct a party relationship may be written to and stored within at least one field of a record within the at least one business data database 405. It, too, for security and privacy reasons, may be encrypted and/or obfuscated prior to being written and stored in a field. If this is the case, then the business data may be decrypted and/or retrieved by a party authorized to use it.

Representative encryption schemes that may be used to protect the biometric and business data at rest and in transit may include, but not be limited to, using SSL protocols, TLS protocols, end-to-end encryption, hashing, symmetric-key algorithms, asymmetric-key algorithms, block ciphers, stream ciphers, elliptic curve cryptography, blockchain cryptography, and/or any combination thereof.

The records of the biometric database 404 and the business data database 405 may each separately or together be implemented as at least one of the following: at least one private or public blockchain ledger, at least one relational database, at least one hierarchical database, at least one object-oriented database, at least one graph database, or any combination thereof. If implemented as at least one blockchain ledger, biometric and business data records may be written as one or more blocks on the at least one blockchain ledger wherein the one or more blocks may be specific to at least one party relationship. If implemented as at least one relational, hierarchical, graphical, or object-oriented database, the biometric and business data records may be organized as at least one or more sequential, indexed, or direct files that may be specific to at least one party relationship. The type of database structure may be used may depend on which database management system is used by the at least one database of the processing system 100.

Within the at least one database of the processing system 100, a primary party's biometric(s) may be associated with at least one business data parameter required to unlock at least one first device and/or conduct at least one party relationship. In a similar manner, at least one second biometric of the at least one primary party may unlock at least one second device and/or conduct at least one second party relationship on the at least one first or second device. Similarly, a secondary party's biometric(s) may be linked to the at least one primary party's biometric(s) to enable the at least one secondary party to enter into, participate in, and/or conduct at least one party relationship of the at least one primary party.

FIGS. 5A-5N illustrate non-limiting examples of how a party's party relationships, biometrics, business data, and/or combinations thereof, may be represented according to the types of database structures mentioned above. Note that the expression of superordinate and subordinate field relationships is representative and that alternative super- and subordinate relations may be used.

FIGS. 5A and 5B illustrate at least one blockchain ledger block wherein at least one party's biometric and business data may be stored in separate ledger blocks and/or on separate blockchain ledgers, respectively, for at least one party relationship. FIG. 5C illustrates a block on a blockchain ledger wherein the biometric and party relationship may be stored together on a single blockchain ledger.

FIGS. 5D and 5E illustrate how at least one party's biometric and business data may be separately stored in a relational memory for at least one party relationship according to non-limiting embodiments, whereas FIG. 5F expresses how the same data may be stored together within one relational database according to non-limiting embodiments. Similarly, FIGS. 5G and 5H illustrate how at least one party's biometric and business data may be separately stored in a hierarchical memory for at least one party relationship according to non-limiting embodiments. FIG. 5I represents how the same data may be stored together in such a database according to non-limiting embodiments.

FIG. 5J and FIG. 5K depict how at least one party's biometric and business data may be separately stored in an object-oriented database for at least one party relationship according to non-limiting embodiments, while FIG. 5K2 represents how these data may be stored together in an object-oriented database according to non-limiting embodiments. FIGS. 5L and 5M indicate how at least one party's biometric and business data may be separately stored in a graphical storage for at least one party relationship according to non-limiting embodiments, and FIG. 5N represents how the same data may be stored together in a graphical database according to non-limiting embodiments.

In non-limiting embodiments, the structures depicted in FIGS. 5A-5N may be enabled using the hashed and/or encrypted representation of the biometric, party and/or party relationship shown. In such a manner, the records to be linked may be linked using technologies appropriate to databases and data structures that may be used to achieve processing efficiencies by reducing data search, access, retrieval and transport times. These technologies may include pointers, Application Programming Interfaces (APIs), mashup applications, and/or network-of-network models, depending on the nature of database structure or structures involved.

If the one or more databases are hierarchal, object oriented, and/or relational, then the biometric data may be represented as a node within the database that may have a field defining a one-way pointer, such as a unidirectional link, to the business data that is required for the party relationship being authorized and that may be stored as another node within the same or a different database. A unidirectional link may be a storage location identifier for a file storage location and/or network location, such as a network address and/or file path. The field may be syntactically defined by one or more parameter names, identifiers, tuples, indices, and/or data types associated with the storage location of the business data node within a database. As an example, Oracle connected user and fixed user links within private databases may be used. Such links may be stored by at least one processor as a link table.

In non-limiting embodiments, if more than one database may be involved, a URL may be used to point from one database to another database.

In non-limiting embodiments where security considerations may be involved, a node from the database holding a primary party's biometric data may send a trusted message signed with its private key to the database node holding the business data. The receiving node may then verify receipt using the sender's public key and the signed message.

If a single blockchain ledger is used, then a pointer may be used if the biometric and business data are stored within the same block of a ledger. If the biometric and business data are stored on separate blockchain ledgers, the separate ledger may be interoperable, in which case an API call (or multiple API calls from within a "mashup application"), an executable command, or another like network-of-network technology may be used to link these data. If an API is used, the API may be defined in terms of its ledger parameters called and/or returned. If a network-of-network model is used, the link may comprise, but not be limited to, at least one hub, bridge, off-chain or middleware system, relay, notary scheme, and/or hash-locking that facilitates cross-communications between the two blockchain ledgers. Representative examples using such links include Crosschain, Cosmos, Hybrix, Polkadot Wanchain, and Ark. The types of link or links used may depend on the blockchain ledgers that interoperate.

In non-limiting embodiments, when at least one party wants to enter into and/or participate in at least one party relationship, at least one matching algorithm is used to at least partially match the at least one party's at least one biometric that may be approved for conducting the at least one party relationship. The matching algorithm used to at least partially match a spatially represented biometric (for example, a voice print, fingerprint, iris, and/or vascular scan or image) may use a distance metric measured between features of the one biometric and the features extracted from a party when they intend to enter into, participate in, and/or conduct a party relationship. A fuzzy logic algorithm may also be used, for example, K-means clustering or modular neural nets. In non-limiting embodiments in which a fuzzy logic algorithm is used, what may constitute a partial match may be based on the degree to which parameters used to assess a match satisfy predefined criteria, a predefined score or threshold criterion, or any combination thereof.

In non-limiting embodiments, the matching algorithm that may be used to at least partially match a spatiotemporally represented biometric (such as a voice print) may comprise one or more linguistic, mathematical, or computational techniques, including but not limited to pattern matching and feature analysis (in which an acoustic or skeletal characteristic of the at least one word, utterance, gesture, gait, or other behavioral or biological characteristic of an at least one primary or secondary party may be at least partially recognized) and/or neural networks (e.g., models that may reliably recognize patterns, such as among acoustic and/or behavioral or biological characteristics). In some non-limiting embodiments, a fuzzy logic method maybe used, for example, a modular neural net or interval type-2 fuzzy logic. What may constitute a partial match may depend on the analyses used, the degree to which parameters used to assess a match satisfy predefined criteria a predefined score or threshold criterion, and/or any combination thereof.

4.0 Non-Limiting Process Embodiments

Although some of the figures described below include flow diagrams with steps that are shown in an order, the steps may be performed in any order, and are not limited to the order shown in those flowcharts. Additionally, some steps may be optional, may be performed multiple times, and/or may be performed by different components. All steps, operations, and functions of a flow diagram that are described herein are intended to indicate operations that are performed using programming in a special-purpose computer or general-purpose computer, in various non-limiting embodiments. In other words, each flow diagram in this disclosure, in combination with the related text herein, is a guide, plan, or specification of all or part of an algorithm for programming a computer to execute the functions that are described. The flow diagrams and related text in this disclosure have been prepared to convey information at a level of sufficiency and detail that is normally expected in the field when skilled persons communicate among themselves with respect to programs, algorithms and their implementation.

Figure 6:
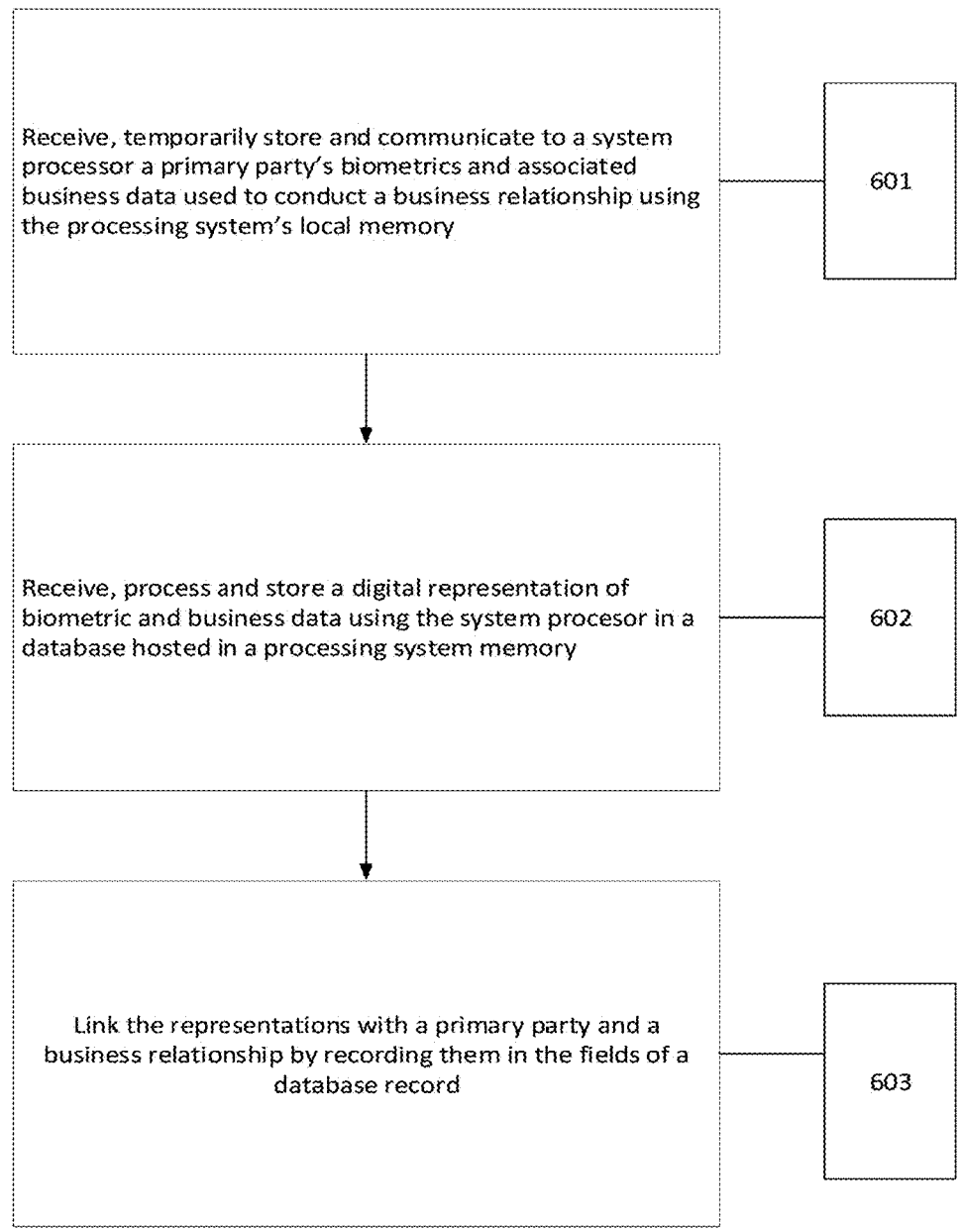
FIG. 6 is a non-limiting flow diagram of processing steps according to the principles of the present disclosure.

FIG. 6 illustrates at least one non-limiting expression or aspect of the steps needed to enroll, store, and use at least one primary party's at least one biometric and business data in a processing system to conduct at least one party relationship. In step 601 a processing system's local memory receives and stores, at least temporarily, at least one primary party's biometric and business data used to conduct the party relationship and communicates these to at least one processor within the processing system. The at least one processor receives and processes the data, and then generates and stores at least one digital representation of the at least one biometric and business data in at least one database hosted in at least one memory of the processing system in step 602. Finally, in step 603, the at least one processor links the at least one stored biometric and business data with the at least one party and at least one party relationship by recording a linkage or other like representation in at least one field of at least one data record.

Figure 7:
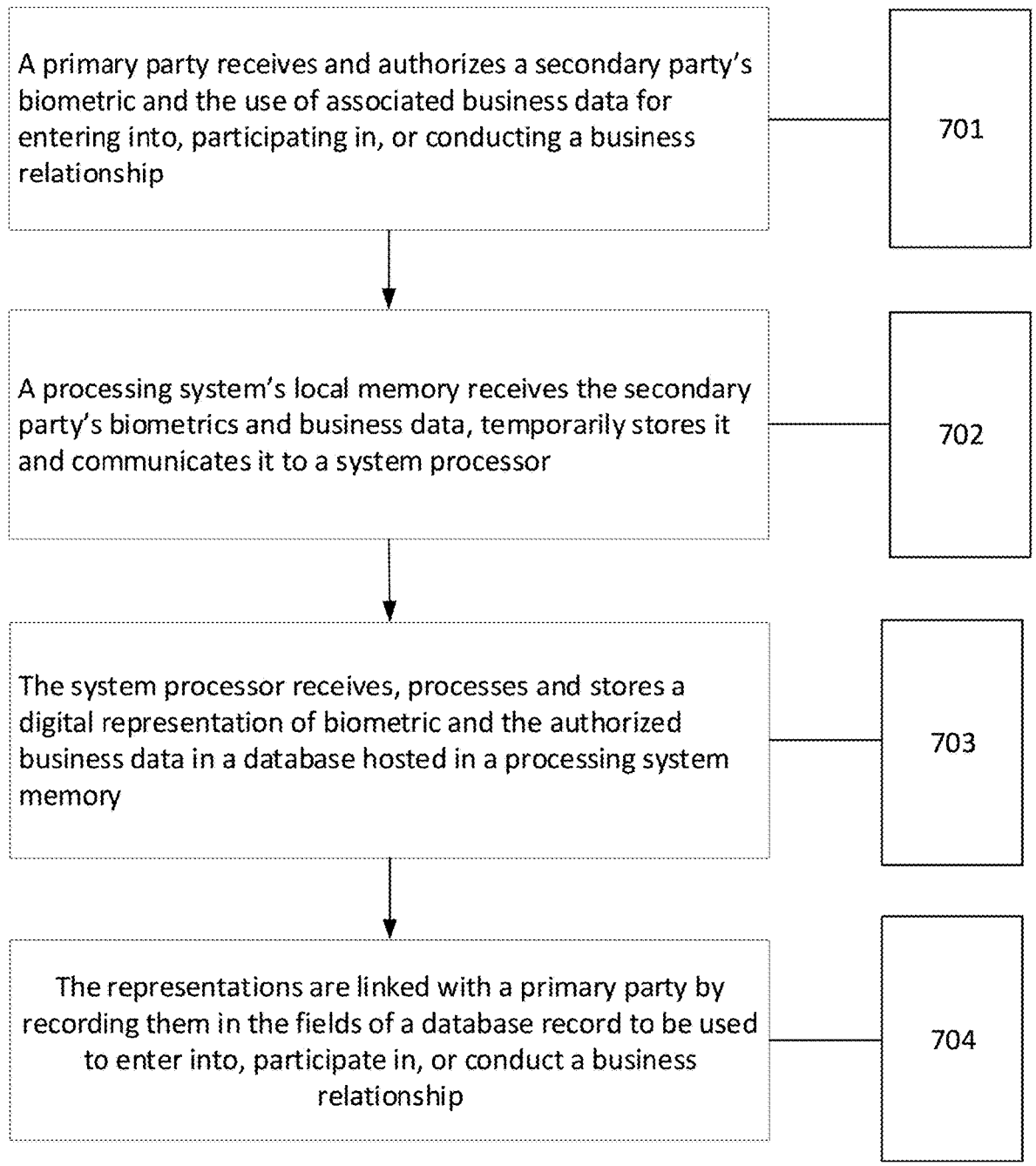
FIG. 7 is a non-limiting flow diagram of processing steps according to the principles of the present disclosure.

FIG. 7 exemplifies a non-limiting expression or aspect of the steps needed to enroll, store and use at least one secondary party's at least one biometric and business data in a processing system to conduct at least one party relationship. In step 701, at least one primary party receives and authorizes at least one secondary party's biometric and business data to be used to enter into, participate in, or conduct at least one party relationship. In step 702, the processing system's local memory receives, at least temporarily stores, and communicates the secondary party's biometric and business data used to conduct a party relationship and communicates it to at least one processor within the processing system. The at least one processor receives and processes the data and generates and stores digital representations of the at least one biometric and business data in at least one database hosted in memory of the processing system in step 703. In step 704, the at least one processor links the stored biometric and business data with the at least one party and at least one party relationship by recording them in at least one field of at least one database record.

Figure 8:
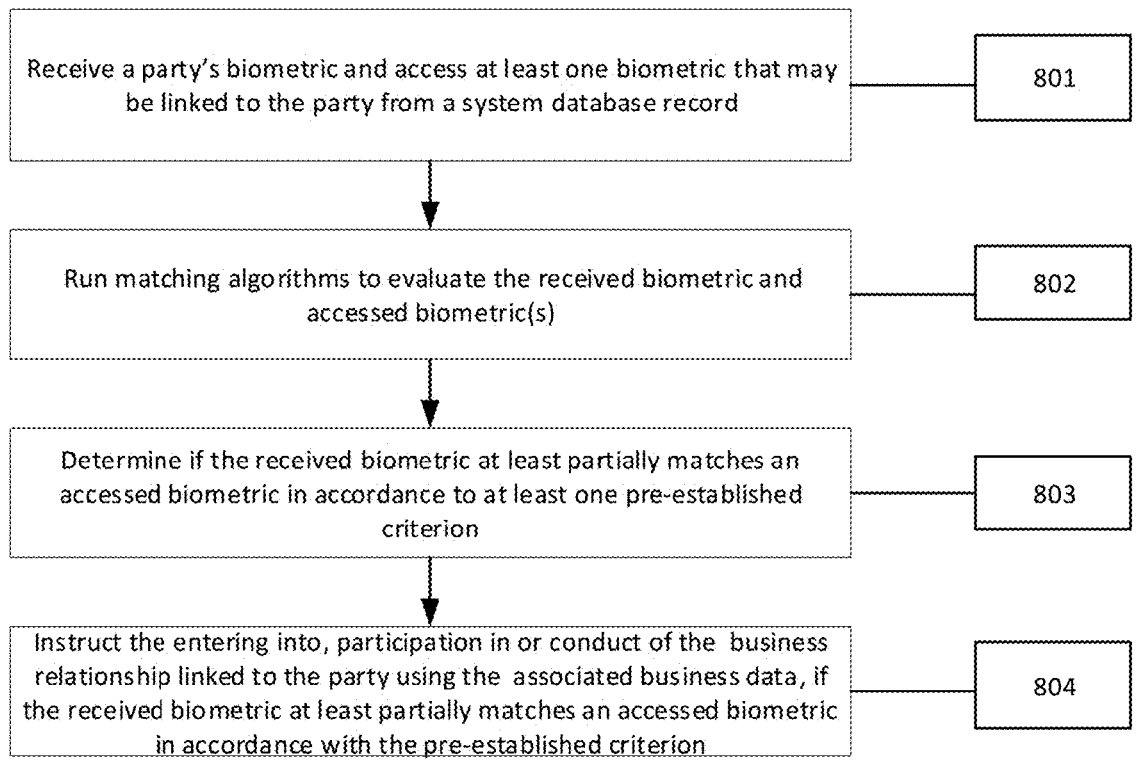
FIG. 8 is a non-limiting flow diagram of processing steps according to the principles of the present disclosure.

FIG. 8 exemplifies a non-limiting expression and/or aspect of processing steps that may be used to conduct at least one party relationship once a party's biometric(s) and business data associated with an at least one party relationship are stored in the at least one processing system. In step 801, a processing system may receive at least one biometric from at least one party to enter into, participate in, or conduct at least one party relationship and may access at least one biometric that may be linked to the party from at least one database record stored in at least one memory. In step 802, at least one processor of the at least one processing system may be configured or programmed to execute at least one matching algorithm to evaluate if the at least one received biometric at least partially matches the at least one accessed biometric. The processor determines in step 803 if there is at least a partial match between the at least one received biometric and at least one accessed biometric in accordance, for example, with at least one distance metric, as described above. If such a match criterion is met, then in step 804 the at least one processor may instruct the entering into, participation in, and/or the conduction of at least one party relationship using the business data for the party whose at least one received biometric at least partially matched.

In the foregoing specification, the example expression or aspect(s) of the present disclosure have been described with reference to numerous specific details. However, the details may vary from implementation to implementation according to the requirements of the particular implement at hand. The example non-limiting expression or aspect(s) are, accordingly, to be regarded in an illustrative rather than a restrictive sense.

The invention claimed is:

1. A multi-biometric authentication method comprising:
   receiving and storing at least one primary party's first biometric;
   receiving at least one authorization instruction from the at least one primary party to store at least one secondary party's at least one biometric;
   receiving and storing the at least one secondary party's at least one biometric;
   linking, in at least one database implemented on at least one blockchain ledger, the at least one secondary party's at least one biometric to the at least one primary party's at least one biometric;
   receiving business data associated with the at least one secondary party's at least one biometric, the business data comprising at least one of the following: a bank account, a business account, a contract number, a party relationship identifier, or any combination thereof;
   linking, in the at least one database implemented on the at least one blockchain ledger, the business data and the at least one secondary party's at least one biometric to the at least one primary party;
   linking, in the at least one database implemented on the at least one blockchain ledger, at least one party relationship associated with at least one other party to the business data, the at least one party relationship comprising a smart contract;
   receiving at least one subsequent biometric from the at least one secondary party after linking the business data and the at least one secondary party's at least one biometric to the at least one primary party;
   following a request to conduct a party relationship between the at least one secondary party and the at least one other party, accessing the at least one secondary party's at least one biometric that was previously stored;
   determining if the at least one subsequent biometric from the at least one secondary party at least partially matches the at least one biometric of the at least one secondary party that was previously stored; and
   in response to determining that the subsequently received second party's at least one biometric at least partially matches the at least one previously stored second party's at least one biometric, authorizing the at least one secondary party to use the business data linked to the at least one primary party in the party relationship between the at least one primary party and the at least one secondary party based on the smart contract linked to the business data, the at least one party relationship comprising the party relationship.

2. The multi-biometric authentication method of claim 1, wherein the at least one biometric of the at least one secondary party comprises at least one of a fingerprint, retinal image, facial image, vascular image, voice print, gesture, gait, behavioral or biological characteristic, or any combination thereof.

3. The multi-biometric authentication method of claim 1, wherein determining if the at least one subsequent biometric from the at least one secondary party at least partially matches the at least one previously stored biometric of the at least one secondary party based on a distance metric measured between biometric features extracted from the at least one previously stored biometric and biometric features extracted from the at least one subsequent biometric.

4. The multi-biometric authentication method of claim 1, wherein the linking comprises inserting a pointer to a database record.

5. The multi-biometric authentication method of claim 1, wherein the linking comprises cross communication between two database records.

6. A multi-biometric authentication system comprising,
   at least one input device;
   at least one local memory;
   at least one biometric database;
   at least one business data database;
   at least one transceiver;
   at least one processor in communication with the at least one input device, the at least one local memory, the at least one biometric database, the at least one business data database, and the at least one transceiver;
   at least one program stored in at least one database, the at least one program comprising instructions that, when executed by the at least one processor, cause the at least one processor to perform the operations of:
      receiving and storing at least one primary party's first biometric;
      receiving at least one authorization instruction from the at least one primary party to store at least one secondary party's at least one biometric;
      receiving and storing the at least one secondary party's at least one biometric;
      linking, on at least one blockchain ledger, the at least one second party's at least one biometric to the at least one primary party's first biometric;
      receiving business data associated with the at least one second party's at least one biometric, the business data comprising at least one of the following: a bank account, a business account, a contract number, a party relationship identifier, or any combination thereof;
      linking, on the at least one blockchain ledger, the business data and the at least one secondary party's at least one biometric to the at least one primary party;
      linking, on the at least one blockchain ledger, at least one party relationship associated with at least one other party to the business data, the at least one party relationship comprising a smart contract;
      receiving at least one subsequent biometric from the at least one secondary party after linking the at least one business data and the at least one secondary party's at least one biometric to the at least one primary party;
      following a request to conduct a party relationship between the at least one secondary party and the at least one other party, accessing the at least one secondary party's at least one biometric that was previously stored;

determining if the at least one subsequent biometric from the at least one secondary party at least partially matches the at least one previously stored secondary party's at least one biometric; and in response to determining that the subsequently received second party's at least one biometric at least partially matches the at least one previously stored second party's biometric, authorizing the at least one secondary party to use the business data linked to the at least one primary party in the party relationship between the at least one primary party and the at least one secondary party based on the smart contract linked to the business data, the at least one party relationship comprising the party relationship.

7. The multi-biometric authentication system of claim 6, wherein the at least one secondary party's at least one biometric comprises at least one of a fingerprint, retinal image, facial image, vascular image, voice print, gesture, gait, behavioral or biological characteristic, or any combination thereof.

8. The multi-biometric authentication system of claim 6, wherein determining if the at least one subsequent biometric from the at least one secondary party at least partially matches the at least one previously stored biometric of the at least one secondary party is based on a distance metric measured between biometric features extracted from the at least one previously stored biometric and biometric features extracted from the at least one subsequent biometric.

9. The multi-biometric authentication system of claim 6, wherein the linking comprises inserting a pointer into a database record.

10. The multi-biometric authentication system of claim 6, wherein the linking comprises cross communication between two database records.

11. A non-transient computer readable medium containing programing instructions for causing a computer to perform the method of:

receiving and storing at least one primary party's first biometric;

receiving at least one authorization instruction from the at least one primary party to store at least one secondary party's at least one biometric;

receiving and storing the at least one secondary party's at least one biometric;

linking, in at least one database implemented on at least one blockchain ledger, the at least one second party's at least one biometric to the at least one primary party's first biometric;

receiving at least one business data with the at least one second party's at least one biometric, the at least one business data comprising at least one of the following: a bank account, a business account, a contract number, a party relationship identifier, or any combination thereof;

linking, in the at least one database implemented on the at least one blockchain ledger, the at least one business data and the at least one secondary party's at least one biometric to the at least one primary party;

linking, in the at least one database implemented on the least one blockchain ledger, at least one party relationship associated with at least one other party to the business data, the at least one party relationship comprising a smart contract;

receiving at least one subsequent biometric from the at least one secondary party after linking the at least one business data and the at least one secondary party's at least one biometric to the at least one primary party;

following a request to conduct a party relationship between the at least one secondary party and the at least one other party, accessing the at least one secondary party's at least one biometric that was previously stored;

determining if the at least one subsequent biometric from the at least one secondary party at least partially matches the least one previously stored secondary party's at least one biometric; and in response to determining that the subsequently received second party's at least one biometric at least partially matches the at least one previously stored second party's at least one biometric, authorizing the at least one secondary party to use the at least one business data linked to the at least one primary party in the party relationship between the at least one primary party and the at least one secondary party based on the smart contract linked to the at least one business data, the at least one party relationship comprising the party relationship.

12. The non-transient computer readable medium containing programing instructions of claim 11, wherein the at least one secondary party's at least one biometric comprises at least one of a fingerprint, retinal image, facial image, vascular image, voice print, gesture, gait, behavioral or biological characteristic, or any combination thereof.

13. The non-transient computer readable medium containing programing instructions of claim 11, wherein the at least one party relationship may comprise a financial transaction, a smart contract, a legal document, a lease or rental agreement, or any combination thereof.

14. The non-transient computer readable medium containing programing instructions of claim 11, wherein determining if the at least one subsequent biometric from the at least one secondary party at least partially matches the at least one previously stored biometric of the at least one secondary party is based on a distance metric measured between biometric features extracted from the at least one previously stored biometric and biometric features extracted from the at least one subsequent biometric.

15. The non-transient computer readable medium containing programing instructions of claim 11, wherein the linking comprises inserting a pointer to a database record.

16. The non-transient computer readable medium containing programing instructions of claim 11, wherein the linking comprises cross communication between two database records.

* * * * *